United States Patent
Purpura et al.

(10) Patent No.: US 6,980,546 B2
(45) Date of Patent: Dec. 27, 2005

(54) BROADBAND INTERNET PROTOCOL TELEPHONY SYSTEM

(75) Inventors: William J. Purpura, Anaheim, CA (US); Kevin M. O'Brien, Los Alamitos, CA (US)

(73) Assignee: The Boeing Company, Chicago, IL (US)

(*) Notice: Subject to any disclaimer, the term of this patent is extended or adjusted under 35 U.S.C. 154(b) by 900 days.

(21) Appl. No.: 09/953,676

(22) Filed: Sep. 17, 2001

(65) Prior Publication Data

US 2003/0053442 A1 Mar. 20, 2003

(51) Int. Cl.[7] ............................................. H04L 12/66
(52) U.S. Cl. .................................... 370/352; 370/316
(58) Field of Search ............................. 370/352, 388, 370/401, 316, 469, 466, 217, 356; 379/88.13, 379/88.25, 88.22, 202.01, 211.02, 265.09, 379/102.05, 102.01; 455/430, 431, 66.1, 455/13.1, 98, 517, 509; 709/217, 246, 203, 709/219, 229–230; 340/521, 506, 533; 348/143; 715/507; 725/76; 342/357.09; 701/1, 36

(56) References Cited

U.S. PATENT DOCUMENTS

| | | | | |
|---|---|---|---|---|
| 5,185,857 | A * | 2/1993 | Rozmanith et al. | 715/507 |
| 5,678,175 | A * | 10/1997 | Stuart et al. | 455/13.1 |
| 6,020,811 | A * | 2/2000 | Saito et al. | 340/438 |
| 6,198,996 | B1 * | 3/2001 | Berstis | 701/36 |
| 6,201,797 | B1 * | 3/2001 | Leuca et al. | 370/316 |
| 6,222,484 | B1 * | 4/2001 | Seiple et al. | 342/357.09 |
| 6,249,913 | B1 * | 6/2001 | Galipeau et al. | 725/76 |
| 6,253,064 | B1 * | 6/2001 | Monroe | 455/66.1 |
| 6,353,734 | B1 * | 3/2002 | Wright et al. | 455/98 |
| 6,496,575 | B1 * | 12/2002 | Vasell et al. | 379/102.05 |
| 6,600,734 | B1 * | 7/2003 | Gernert et al. | 370/352 |
| 6,643,510 | B2 * | 11/2003 | Taylor | 455/431 |
| 6,760,778 | B1 * | 7/2004 | Nelson et al. | 709/246 |
| 6,810,527 | B1 * | 10/2004 | Conrad et al. | 725/76 |

FOREIGN PATENT DOCUMENTS

EP 0 890 907 A1 7/1997

OTHER PUBLICATIONS

Kul Bhasin et al, Advanced Communication and Networking Technologies for Mars Exploration, Apr. 17-20, 2001, National Aeronautics and Space Administration @ Glenn Research Center, pp. 1-9.*

Cruickshank, H. et al; Analysis of IP voice conferencing over EuroSkyWay satellite system;☐☐Communications, IEE Proceedings—☐☐vol. 148, Issue 4, Aug. 2001 pp.:202-206.*

Sun, Z. et al et al; Analysis of IP voice conferencing over geostationary satellite systems☐☐Satellite Services and the Internet (Ref. No. 2000/017), IEE Seminar on☐☐Feb. 17, 2000 pp.:3/1-3/5.*

(Continued)

*Primary Examiner*—Chi Pham
*Assistant Examiner*—Prenell Jones
(74) *Attorney, Agent, or Firm*—Harness Dickey & Pierce P.L.C.

(57) ABSTRACT

A method for providing communication service onboard a remote location where landline and cellular telephone service is unavailable. The method utilizes a communication system that includes an onboard local area network (LAN) having an onboard server, at least one smart communication device operable by an onboard user, and a base station server system having a base station server. The method connects the smart device to the onboard LAN using one of a plurality of input/output (I/O) interfaces, utilizes a wireless communication link and IP telephony to exchange communications between the onboard server and the base station server; and controls data flow within the communication system.

23 Claims, 2 Drawing Sheets

OTHER PUBLICATIONS

WO 00/63806.

Publication entitled: "System Support For Mobile Computing" by Michael Beigl and Rimkbert Rudisch; Comput. & Graphics, vol. 20, No. 55, pp 619-625, 1996.

Publication entitled: "IP Services over Bluetooth: Leading the Way to a New Mobility" by Markus Albrecht; Matthias Frank; Peter Martini; Markus Schetelig; Asko Vilavaara and Andre Wenzel.

* cited by examiner

BROADBAND INTERNET PROTOCOL TELEPHONY SYSTEM

FIELD OF THE INVENTION

The invention relates generally to wireless voice communication, and more specifically to obtaining Internet protocol (IP) telephony services at, or onboard, remote locations where traditional landline and cellular type service is not available.

BACKGROUND OF THE INVENTION

Obtaining telephone service at a remote location without cellular or landline phone service, such as onboard an aircraft, a train, a bus, or a ship, is expensive and rare. As used herein, remote location refers to either a fixed or a mobile remote location. Such service is expensive and rare because of a lack of available bandwidth and adequate technical infrastructure at the remote location. Additionally, such infrastructure is typically only accessible using limited types of interfaces.

Generally, present systems at, or onboard, remote locations use an infrastructure that provides telephone service similar to using a regular landline phone. Typically, an onboard communication network, or infrastructure, utilizes radio frequency (RF) communication streams to allow calls to be transmitted between the remote location and a base station connected to a landline phone system. Additionally, onboard users located at, or onboard, the remote location are restricted to utilizing onboard handsets to interface to with the onboard network.

Furthermore, typical onboard systems are limited in the amount of accessible bandwidth and lack flexibility of use. For example, due to the limited amount of bandwidth available to the system, typical onboard systems must restrict the number of onboard users that can simultaneously utilize the system to communicate to with the base station. Additionally, typical onboard systems do not allow onboard users to connect to the system using smart devices operable for two-way voice communication, such as cell phones, lap top computers, and personal data assistants (PDA's).

Further yet, typical onboard systems are not well suited to allow communications between a plurality of onboard users, or to allow incoming calls to an onboard user from a person not located at the remote location. Even further, the infrastructure of typical systems can not be used for other types of data transmission without significant modification. Such limitations of typical onboard systems make them complicated, difficult, and expensive to install and utilize.

Therefore, it is desirable to develop a wireless voice communication system for a remote location, where traditional landline and cellular type services are not available, that is more flexible and less expensive to use than present systems, and can be implemented utilizing existing infrastructure.

BRIEF SUMMARY OF THE INVENTION

In one preferred embodiment, a system is provided for making communication service available onboard a remote location where landline and cellular telephone service is unavailable. The system includes an onboard local area network (LAN) that includes a plurality of input/output (I/O) interfaces. Additionally, the system includes at least one smart communication device operable by an onboard user, connected to the onboard LAN using at least one of the I/O interfaces. Furthermore, the system includes a base station server system for communicating with the onboard LAN utilizing a wireless communication link and IP telephony.

In another embodiment, a method is provided for making communication service available onboard a remote location where landline and cellular telephone service is unavailable. The method utilizes a communication system that includes an onboard local area network (LAN) having an onboard server, at least one smart communication device operable by an onboard user, and a base station server system having a base station server. The method connects the smart device to the onboard LAN using one of a plurality of input/output (I/O) interfaces, utilizes a wireless communication link and IP telephony to exchange communications between the onboard server and the base station server; and controls data flow within the communication system.

BRIEF DESCRIPTION OF THE DRAWINGS

The present invention will become more fully understood from the detailed description and the accompanying drawings, wherein.

DETAILED DESCRIPTION OF THE INVENTION

Figure 1:
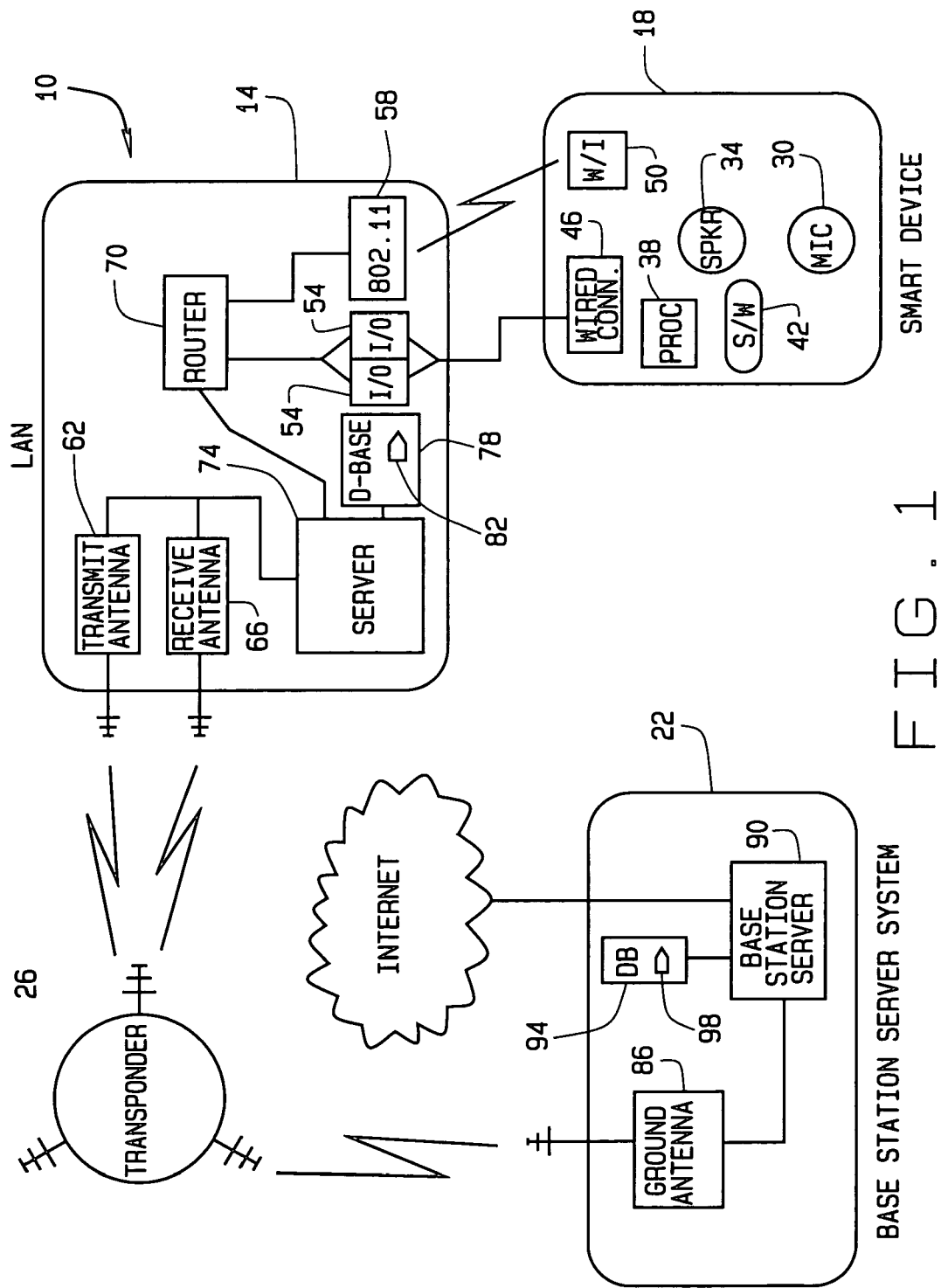
FIG. 1 is a schematic of a communication system for providing Internet Protocol (IP) telephony services onboard a remote location, in accordance with a preferred embodiment of the present invention.

FIG. 1 is a schematic of a communication system 10 for providing Internet Protocol (IP) telephony services onboard a remote location where landline and cellular telephone service is unavailable, in accordance with a preferred embodiment of the present invention. System 10 includes an onboard local area network (LAN) 14 at a remote location, such as a plane, train, ship, or building, which is inaccessible by landline and cellular telephone service. Additionally, system 10 includes at least one smart device 18 capable of two-way voice communication, and a base station server system 22 located off board at a location accessible by landline and cellular telephone service. Base station server system is connected to a landline telephone system (not shown) and exchanges voice data with LAN 14, via a satellite, or orbiting transponder, 26. Additionally, base station server system 22 includes a high bandwidth connection to the Internet.

Smart device 18 is any device capable executing IP Telephony software and two-way voice communication, such as an appropriately equipped laptop computer, personal data assistant (PDA), or cell phone. Smart device 18 is operable by an onboard user located at the remote location, such as a passenger or crewmember of a plane. Smart device 18 includes a microphone 30, a speaker 34, a processor 38 for executing all functions of smart device 18, including IP telephony software, and a smart device software package 42 for performing various smart device functions, such as verifying connection of smart device 18 to LAN 14, and enabling IP telephony functionality of smart device 18. Additionally, smart device 18 interfaces with LAN 14 using any suitable interface connection. For example, in one embodiment, smart device 18 interfaces with LAN 14 using a physical, or wired, connection 46, such as a USB port or a RJ45 Ethernet port. In another embodiment, smart device 18 interfaces with LAN 14 using a wireless interface 50.

In one embodiment, LAN 14 includes a plurality of wired input/output (I/O) interfaces 54, such as a USB port, or an Ethernet port, which allow data and voice communications between smart device 18 and LAN 14. Interfaces 54 are conveniently located at the remote location for easy access by onboard users. For example, on a plane, interfaces 54 are located in seat backs, such that an onboard user conveniently connects to LAN 14 using the interface connection in the back of the seat located in front of the onboard user. In an alternate embodiment LAN 14 is a wireless Ethernet LAN including at least one wireless interface 58 for communicating between smart device 18 and LAN 14. In yet another embodiment, LAN 14 is an Ethernet LAN having both wired interfaces 54 and wireless interface 58.

LAN 14 transmits, and receives, data and voice communications to and from base station server system 22 using a high bandwidth wireless communication link, such as a satellite communication link. In the preferred embodiment, LAN 14 utilizes transponder 26 to provide a specialized radio frequency (RF) satellite link to base station server system 22. However, LAN 14 can be connected to base station server system 22 using any suitable communication link. Additionally, LAN 14 includes a transmit antenna 62 and a receive antenna 66 for exchanging communications with transponder 26, and a router 70 connected to an onboard server 74. Router 70 routes communications through LAN 14.

Onboard server 74 is connected to an onboard server database 78, which electronically stores information and data utilized by onboard server 74. In one embodiment, onboard server database 78 includes an onboard server software package 82 executable by onboard server 74. Software package 82 is used for performing various operations of LAN 14 including enabling LAN 14 to exchange IP telephony communications with smart device 18 and base station server system 22. In an alternative embodiment, onboard server software package is stored in an electronic memory device (not shown) included in onboard server 74.

Base station server system 22 includes a ground antenna 86 for receiving and transmitting data and voice communications to and from LAN 14, via transponder 26. Additionally, base station server system 22 includes a base station server 90, a base station server database 94 connected to base station server, and a base station server software package 98 executable by base station server 90 to perform all operations of base station server system 22. Base station server system operations include such functions as, enabling base station server 90 to connect to the Internet, exchanging IP telephony communications with onboard server 74, and exchanging voice and data communications with an off board location (not shown).

An off board location is any location separate from the onboard remote location of LAN 14, where an off board user, or automated system, utilizes communication system 10 to exchange data or voice communications with an onboard user operating smart device 18. The off board location, or user, connects to base station server 90 using a voice and data communication device, such as an appropriately equipped cell phone, computer, or PDA. Once connected to base station server 90, the off board location utilizes system 10 to exchange data or voice communication with an onboard user.

Communications system 10 is software based and utilizes three separate software packages. Smart device software package 42 is installed on smart device 18, onboard server 74 executes onboard server software package 82, and base station server software package 98 is executed by base station server 90.

Smart device software package 42 allows the onboard user to connect to, or establish a communication link with, LAN 14, via interfaces 46 and 54, or interfaces 50 and 58. Once the onboard user connects to LAN 14, smart device processor 38 executes software package 42 to perform hand-shaking procedures with LAN 14 to verify connection to LAN 14 and provide IP telephony functionality of smart device 18. Additionally, smart device software package 42 will monitor LAN 14 to determine whether other smart devices 18 are connected to LAN 14. Monitoring LAN 14 for other smart devices 18 allows direct communication between two smart devices 18 connected to LAN 14, and conferencing between a plurality of smart devices 18 connected to LAN 14, without the need to traverse a broader network. Furthermore, smart device software package 42 allows the onboard user to utilize all the normal functions of smart device 18 using LAN 14 instead of a cellular, or PCS, type RF link. Server software package 42 allows an onboard user to utilize IP telephony to place a telephone call to another onboard user, or to an off board location, by dialing an existing public switched telephone network (PSTN) number.

When placing an off board call, an onboard user utilizes smart device 18 to dial the PSTN number of a desired off board location. Smart device 18 communicates with LAN 14, which utilizes router 70, server 74, and transmit antenna 62 to transmit an IP telephony signal to transponder 26. Transponder 26 in turn communicates the signal to base station server system 22. Base station server system 22 is connected a terrestrial telephone network via landlines or a cellular network system, which relays the signal to the terrestrial telephone network. Once connection with the terrestrial telephone network is established, the onboard user and the off board location exchange IP telephony communications, via the terrestrial telephone network.

Onboard server software package 82 monitors when IP telephony enabled smart device 18 connects to LAN 14, and allows the onboard user to register onboard user information in database 78. Onboard user information includes such information as a smart device telephone number, a smart device configuration setting, a smart device data rate, a user availability, and a user location. Additionally, server software package 82 monitors attempts by the onboard user to make telephone calls, or transfer data, to an off board location, and provides a message to the onboard user pertaining to the attempted call. The message will provide such information as, the cost of the call, probable voice and data quality, and whether the call is allowed or will be blocked. Furthermore, onboard server software package 82 enables interfacing between onboard server 74 and base station server system 22, via transponder 26. Further yet, onboard server software package 82 communicates LAN 14 status information to base station server 90, such as the configuration of LAN 14, and information required to enable smart device 18 to receive calls from an off board location.

Even further, onboard server software package 82 enables onboard server 74 to monitor and track ongoing calls by onboard users, and provide an onboard systems administrator with LAN maintenance information, such as performance, timing, and billing information, needed to maintain LAN 14 running in an efficient and cost effective manner. Onboard server software package 82 provides a system level routing control to allow onboard users and onboard personnel, such as passengers and crewmembers of a plane, to use smart devices 18 to communicate among onboard users, among onboard personnel, or among onboard personnel and onboard users.

In one embodiment, smart device 18, used by onboard personnel, serves as a 'browsing' device connected to onboard server 74 providing additional service to onboard users, via a local web portal. Onboard personnel connect smart device 18 to LAN 14 using interfaces 46 and 54, or interfaces 50 and 58. Once connected to LAN 14, the onboard personnel uses a web-browsing feature of smart device 18 to exchange communications with onboard server 74 and determine any additionally needs of a passenger. Onboard personnel can also use smart device 18 to communicate with other onboard personnel, communicate with a passenger, or call an off board location using the broadband access to base station server system 22.

Base station server software package 98 enables interfacing between base station server system 22 and onboard server 74, via transponder 26, and routes IP telephony calls to an IP gateway. The IP gateway ensures that as data from one side of the gateway passes through the gateway, the data is in the appropriate format to traverse the network on the other side of the gateway. Additionally, base station server software package 98 enables base station server 98 to interface with Local Number Portability (LPN) systems, thereby allowing onboard users to receive calls from off board locations. LNP systems provide the capability for an onboard user to traverse multiple telephone networks while retaining the same telephone number, thereby allowing the onboard user to be reached at the same number regardless of the onboard user's location. Therefore, base station software package 98 interfaces with LNP systems to properly route incoming calls to smart device 18 of a specific onboard user.

Furthermore, base station server software package 98 enables onboard users to register onboard user information in base station server database 94. Onboard user information includes information such as, a smart device telephone number, a smart device configuration, a smart device data rate capability, an onboard user availability, and an onboard user location. An off board location accesses base station server 90, via a landline or cellular connection through the IP gateway, and queries base station server 90 for the onboard user information that will assist in placing a call from the off board location to an onboard user using LNP systems.

Figure 2:
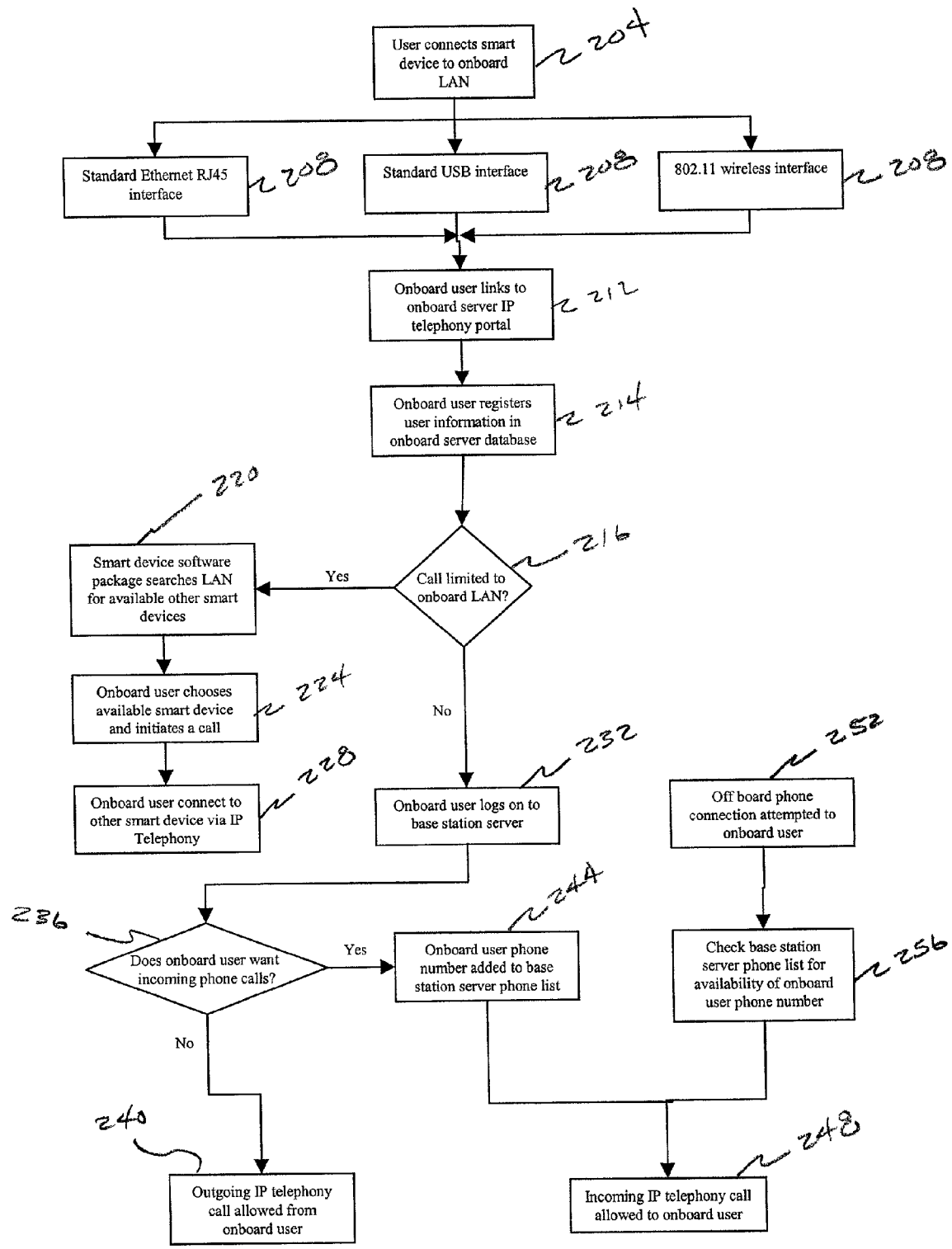
FIG. 2 is a flow diagram of one embodiment of an IP telephony communication process utilized with the communication system shown in FIG. 1.

FIG. 2 is a flow diagram 200 of one embodiment of an IP telephony communication process utilized with the communication system 10, shown in FIG. 1. An onboard user, such as a plane passenger or personnel, connects smart device 18 (shown in FIG. 1) to LAN 14 (shown in FIG. 1) using interfaces 46 and 54, or interfaces 50 and 58, (shown in FIG. 1), as indicated at steps 204 and 208. Once connected, the onboard user logs onto onboard server 74 (shown in FIG. 1) and links to an IP telephony portal, as indicated at step 212, thereby enabling the onboard user to place a telephone call. After logging onto onboard server 74, the onboard user registers user information in onboard server database 78 (shown in FIG. 1), as indicated at step 214. When an onboard user attempts to place a telephone call, onboard server software package 82 determines, at step 216, whether the attempted call is to another onboard user, such as another plane passenger or personnel, or to an off board location.

If the attempted call is to another onboard user, smart device software package 42 (shown in FIG. 1) queries LAN 14 for a list of other onboard smart devices 18, also connected to LAN 14, that desire to receive incoming calls, as shown in step 220. The list of onboard users is stored in onboard server database 78, along with the other onboard user information described above. If a desired smart device is listed, the onboard user initiates the call by dialing a standard PSTN telephone number of the desired smart device registered in onboard server database 78, and provided on the list of other onboard smart devices 18, as indicated at step 224. After the onboard user dials the desired telephone number, onboard server 74 and router 70 (shown in FIG. 1), connect the onboard user's smart device 18 with the desired on board user's smart device 18 using IP telephony, as indicated at step 228.

If the attempted call is to an off board location, the onboard user logs onto base station server 90 (shown in FIG. 1), as indicated at step 232. Once the onboard user is logged onto server 90, onboard software package 82 utilizes the onboard user information stored in onboard database 78 to determine whether the onboard user desires to receive incoming telephone calls, as indicated at step 236. Incoming calls can be from either another onboard user or an off board user. If the onboard user does not desire to receive incoming calls, onboard server software package 82 allows outgoing calls and blocks all incoming calls to the onboard user, as indicated at step 240. If the onboard user desires to receive incoming calls, onboard server software package 82 adds the onboard user's smart device telephone number to the list of onboard user information stored on onboard server database 78, and to a similar list stored in base station server database 94, as indicated in step 244. Once the onboard user's information is stored, onboard server 74 allows incoming IP telephony calls to be routed to the onboard user, as indicated in step 248.

When an off board location desires to call an onboard user, the off board location connects to base station server 22 using a landline or cellular system, as indicated in step 252. Once the off board location is logged onto base station server 22, base station server software package 98 queries base station server database 94 for the list of onboard users that desire to receive incoming telephone calls, as indicated in step 256. If the desired onboard user smart device telephone number is listed, the off board location dials the standard PSTN telephone number of the onboard user's smart device, and base station server 90 connects with onboard server 74, via the broadband link to transponder 26, thereby allowing an IP telephony call to be routed to the onboard user, as indicated in step 248.

While the invention has been described in terms of various specific embodiments, those skilled in the art will recognize that the invention can be practiced with modification within the spirit and scope of the claims.

What is claimed is:

1. A system for providing communication service onboard a remote location where landline and cellular telephone service is unavailable, said system comprising:
   an onboard local area network (LAN) including a plurality of input/output (I/O) interfaces and an onboard server;
   at least one smart communication device operable by an onboard user, connected to an IP telephony portal of said onboard server using at least one of said LAN I/O interfaces, said smart device including a processor configured to execute a smart device software package to enable IP telephony functionality of the smart device; and
   a base station server system configured to communicate with said onboard LAN utilizing a wireless communication link and Internet Protocol (IP) telephony.

2. The system of claim 1, wherein said smart device software package is executable to verify connection of said smart device to said onboard LAN and enable IP telephony functionality of said smart device.

3. The system of claim 1, wherein said smart device software package is executable to determine whether at least one other smart device is connected to said onboard LAN.

4. The system of claim 1, wherein said smart device software package is executable to allow functionality of said smart device using said onboard LAN instead of a cellular type radio frequency link.

5. The system of claim 1, wherein said smart device software package is executable to allow communication between a plurality of said smart devices utilizing the onboard LAN.

6. The system of claim 1, wherein said smart device software package is executable to allow phone calls to be placed using said smart device by dialing an existing public switched telephone network based telephone number.

7. The system of claim 1, wherein said onboard LAN comprises an onboard server database connected to said onboard server, and an onboard server software package, said onboard server configured to execute said onboard server software package.

8. The system of claim 7, wherein said smart device is IP telephony enabled, and said onboard server software package is executable to:
monitor whether said IP telephony enabled smart device is connected to said onboard LAN; and
allow the onboard user to register, in said onboard server database, onboard user information including at least one of a smart device telephone number, a smart device configuration setting, a smart device data rate capability, an onboard user availability and an onboard user location.

9. The system of claim 8, wherein said onboard server software package is executable to monitor attempts by the onboard user to make phone calls from said smart device to an off board destination and provides an information message to the onboard user relating to the attempted call.

10. The system of claim 8, wherein said onboard server software package is executable to enable interfacing between said onboard server and said base station server system utilizing said wireless communication link, thereby communicating to said base station server system a current configuration of said onboard LAN and information required to allow said smart device to receive a call from an off board source.

11. The system of claim 8, wherein said onboard server software package is executable to track ongoing calls and maintain operation of said onboard LAN.

12. The system of claim 1, wherein said onboard LAN comprises an onboard server, and said base station server system comprises a base station server, a base station server database connected to said base station server, and a base station server software package, said base station server configured to execute said base station server software package.

13. The system of claim 12, wherein said base station server software package is executable to:
enable interfacing between said base station server system and said onboard server utilizing said wireless communication link; and
route IP telephony calls to an IP telephony gateway.

14. The system of claim 13, wherein said base station server software package is executable to:
allow the onboard user to register in said base station server database, onboard user information including at least one of a smart device telephone number, a smart device configuration setting, a smart device data rate capability, an onboard user availability and an onboard user location; and
provide the onboard user information to an off board user of said base station server system.

15. A method for providing communication service on a remote location where landline a cellular telephone service is unavailable, utilizing a communication system including an onboard local area network (LAN) including an onboard server, at least one smart communication device operable by an onboard user, and a base station server system including a base station server, said method comprising:
connecting the smart device to the onboard LAN using one of a plurality of input/output (I/O) interfaces thereby linking the smart device to an onboard server IP telephony portal;
enabling IP telephony functionality of the smart device utilizing a smart device software package;
utilizing a wireless communication link and Internet Protocol (IP) telephony to exchange communications between the onboard server and the base station server; and
controlling communication data flow within the communication system.

16. The method of claim 15, wherein connecting the smart device to the onboard LAN comprises connecting the smart device to the onboard LAN utilizing at least one of an Ethernet RJ45 interface, a USB interface, and a wireless interface.

17. The method of claim 15 further comprising establishing a high bandwidth connection between the base station server and the Internet.

18. The method of claim 15, wherein controlling communication data flow comprises:
sending a call request from the smart device to the onboard server;
determining whether the call request is a local request; and
determining whether the call request is an off board request.

19. The method of claim 18, wherein, if it is determined that the call request was a local request, controlling communication data flow further comprises:
sending a list of other smart devices connected to the onboard LAN to the smart device that initiated the call request;
choosing a smart device to call from the list of connected smart devices;
initiating a call to the chosen smart device; and
establishing communication between the smart device that initiated the call and the chosen smart device utilizing IP telephony.

20. The method of claim 18, wherein, if it is determined that the call request is an off board request, controlling communication data flow further comprises:
logging the user onto an IP server; and
determining whether the onboard user desires to receive incoming calls from an off board location.

21. The method of claim 20, wherein, if it is determined that the onboard user does not desire to receive incoming calls, controlling communication data flow further comprises allowing outgoing IP telephony calls from the onboard user.

22. The method of claim 20, wherein, if it is determined that the onboard user desires to receive incoming calls from an off board location, controlling communication data flow further comprises:
adding an onboard user phone number to a base station server phone list; and allowing incoming IP telephony calls to the onboard user from an off board location.

23. The method of claim 15, wherein controlling communication data flow comprises:
attempting to call an onboard user from an off board location;
checking a base station server phone list to determine the availability of desired onboard user phone number; and
allowing incoming IP telephony calls to an onboard user from an off board location.

* * * * *